(12) United States Patent
Rodriguez

(10) Patent No.: US 6,269,217 B1
(45) Date of Patent: Jul. 31, 2001

(54) MULTI-STAGE ELECTRONIC MOTION IMAGE CAPTURE AND PROCESSING SYSTEM

(75) Inventor: Nestor M. Rodriguez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/082,958

(22) Filed: May 21, 1998

(51) Int. Cl.$^7$ ........................................... H04N 5/91
(52) U.S. Cl. ............................. 386/46; 386/117; 386/130
(58) Field of Search ........................ 386/46, 107, 117, 386/130, 129, 131; 358/906, 909, 518; 348/97, 720; 382/232; H04N 5/76

(56) References Cited

U.S. PATENT DOCUMENTS

| | | | |
|---|---|---|---|
| 4,994,901 | * 2/1991 | Parulski et al. | 348/720 |
| 5,189,511 | * 2/1993 | Parulski et al. | 358/518 |
| 5,412,773 | * 5/1995 | Carlucci et al. | 348/97 |
| 5,646,750 | * 7/1997 | Collier | 358/518 |
| 6,009,201 | * 12/1999 | Acharya | 382/232 |

* cited by examiner

*Primary Examiner*—Huy Nguyen
(74) *Attorney, Agent, or Firm*—Peyton C. Watkins; Stephen H. Shaw

(57) ABSTRACT

An electronic image capture system for capturing a sequence of images, the system includes a camera that captures a sequence of incoming incident light on a sensor and records the sequence of images as wide gamut image data. A processor receives the wide gamut image data and processes the image data to provide a film-like image sequence.

15 Claims, 2 Drawing Sheets

MULTI-STAGE ELECTRONIC MOTION IMAGE CAPTURE AND PROCESSING SYSTEM

FIELD OF THE INVENTION

The invention relates generally to the field of electronic capture of motion image sequences and, more particularly, to an electronic motion image capture system which provides a digital record by separating the image capture stage from the image processing.

BACKGROUND OF THE INVENTION

High quality images for the entertainment industry (theatrical motion pictures, television, special venues, and the like) have been primarily captured by traditional motion picture cameras, or film systems, due to the limitations possessed by video cameras. These limitations result from the video camera's internal processing of the electro-optical sensor image data that conforms it to existing video standards, and causes the image data available for further processing to be bandwidth limited. Therefore, reducing the effective dynamic range and detail of the three color image records captured by the sensor.

When originating with film for television, the images are captured by exposing the film in a motion picture camera (typically at 24 frames per second although not limited to this frame rate), and subsequently, chemically processing the film. The resultant film sequences are then transferred to the video domain on a machine, referred to in the art as a telecine. The telecine scans the film image and converts it to the appropriate electronic video standard signals.

In this conversion to a video signal, interactive tools are provided, by a system known as a color corrector, to manipulate the color and tone scales of the images to create the desired look (as perceived by the telecine operator and/or the customer) of a film image on the video system.

Film products are able to capture a wide exposure latitude or dynamic range of contrast in a scene. Details in the shadows or dark areas of a scene, plus the details of highlights or bright areas are captured well by film. In shooting (exposing) film, the cinematographer understands the latitude of film and uses lighting to make best usage of that latitude, knowing that the video transfer process will later allow him to select the limited final image contrast and content of the television image. This whole process of capturing a wide latitude record and subsequently processing and selecting the conversion into the final narrower latitude of the video domain (dependent on the video standard) is a significant advantage of film origination over video originated systems. The telecine transfer operation also permits some content "framing" of the images from the film. This includes zooming, panning and rotation during the scan operation to recompose the film image for the television frame.

A number of factors make film the current method for image capture for television. One major factor is the creativity available in the color correction operation described above. The user has the ability to carefully and interactively decide how shadows, highlights, mid-tones, skin tones and other color objects will look on the final television image. Another factor is film's ability to maintain image detail in the extremes of the dynamic range which can be recovered should the film be incorrectly exposed, or if factors in the scene cannot be controlled, such as those in which scene content includes both bright highlights (e.g. detail in a white satin dress) and shadows (e.g. detail in dark wood).

Video systems (that is, traditional prior art electronic motion image capture systems), on the other hand, have a more limited dynamic range or contrast ratio. Video camera systems and associated recording/transmission systems only manage a narrow contrast ratio. Often image color detail in dark shadows and/or bright highlights is lost ("crushed" blacks and/or "clipped highlights") by the video process. This limited dynamic range is no longer necessarily a result of video camera and recording technology, however. Rather, the present inventions have recognized that the limitations are imposed by requiring the recording signal color metric to be "TV display ready" or "rendered" for the TV display.

When images are captured using a video camera (which captures/processes a motion image electrical signal) and recorder, the system is designed to process the signals and provide a finished image within the bandwidth limitations of a specific television/video standard (which is inherent in the design of the particular camera-recorder system, for example ITU-R Rec. 601-3, ANSI/SMPTE 274M-1995, etc.). In addition to the processing implemented to meet the signal/recording requirements of a specified video standard, video cameras also provide various types of controls to achieve the image "look" desired by a user. In a simple camera, this may just be white balance. Other controls such as brightness (exposure), gamma (contrast), and color matrixing could also be provided. Some sophisticated cameras may provide a range of "knee" point/slope settings (tone scale manipulation), filtering and various image processing controls to adjust the image being recorded. However, all these adjustments must be made on the camera before the images are captured, and are of a "trial-and-error" type. Image quality, therefore, relies on the user's knowledge and experience.

In practice, the image recorded by the video camera systems is recorded to a defined video display standard, and as such, contains less image information capacity relative to what is captured by the video camera sensors. Factors in the design and specification of these video standards (gamma correction, color sub-sampling, compression, etc.) result in the amount of image information available for creating special effects, theatrical images—and even television—being relatively limited. Often, after capturing the video images, the users may wish to adjust the images with color corrector tools similar to those described above in the telecine process, only in this situation the images are coming from a video source (e.g. video tape). The range of adjustments that can be made to the video originated images is limited since the color metric used to record the video signals at the time of image capture is rendered for the TV display. Thus, the creativity gamut of this process is considerably less than available using film and a telecine machine. Since video standards are also not compatible with each other (component vs. composite video, NTSC vs. PAL, standard versus digital high definition, etc.), the quality of the images produced when converting from a lower to a higher order video standard/format results in a lower quality image (e.g. artifacts).

While the sensors inside a digital video camera are generally able to capture a wide dynamic range (some approaching the dynamic range/resolution of negative film), this is reduced by the processing in the camera down to a range that can be recorded in a standard video format signal (e.g. ITU-R Rec. 601-3). Various user controls, internal setups, automatic functions and processing occur to scale the range of image information the sensor captures down to the image extent of the specific video format (standard) to be recorded/transmitted. These operations can include black and white level clamping or clipping, gamma adjustments, white balancing, "knee" adjustments and more. Even when these operations are performed in the digital video domain, the amount of image information available for creative manipulation or producing high quality images (e.g. theatrical motion pictures) recorded with a digital camera (whether analog or digital) is limited relative to what is achievable with film.

It would be desirable then to provide a means, by which original scenes can be captured using electronic digital motion cameras as an alternative to video, to simulate the imaging benefits produced with a traditional motion picture camera/film/processor system. Capturing the image information in a "data-type" format, independent of any particular video format/standard, would also allow for the same type of compatibility encountered when converting film images to any video format, as well as flexibility when transferring to other imaging media requiring a higher level of image fidelity (e.g. theatrical film images) than is currently available from any digital video technology. In addition, it would be desirable to provide a processing step that would further apply a set of algorithms to the captured "latent" image data to "develop" a digital image record simulating the attributes of the optical image of a motion picture film. The image data record produced by applying the present invention could then be manipulated for "creative effects" by currently utilized post-production tools (e.g. color corrector previously mentioned) employed with motion images captured on film.

SUMMARY OF THE INVENTION

The present invention is directed to overcoming one or more of the problems set forth above. Briefly summarized, according to one aspect of the present invention, the invention resides in an electronic image capture system for capturing a sequence of images, the system comprising a camera that captures a sequence of incoming incident light on a sensor and records the sequence of images as wide gamut image data; and a processor that receives the wide gamut image data and processes the image data to provide a film-like gamut output image sequence.

It is an object of the present invention to produce a data record having as much information about the image as is capable of being captured by the sensor system without the need to have the image data record be in a form ready for video display rendering.

It is a further object of the image capture stage to not bandwidth limit or reduce the image content captured by the sensors in the same manner as occurs in a video camera's processing so that the image data record is video format independent, scalable and can be manipulated in the same fashion as the digital RGB data obtained from a scanned film negative.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
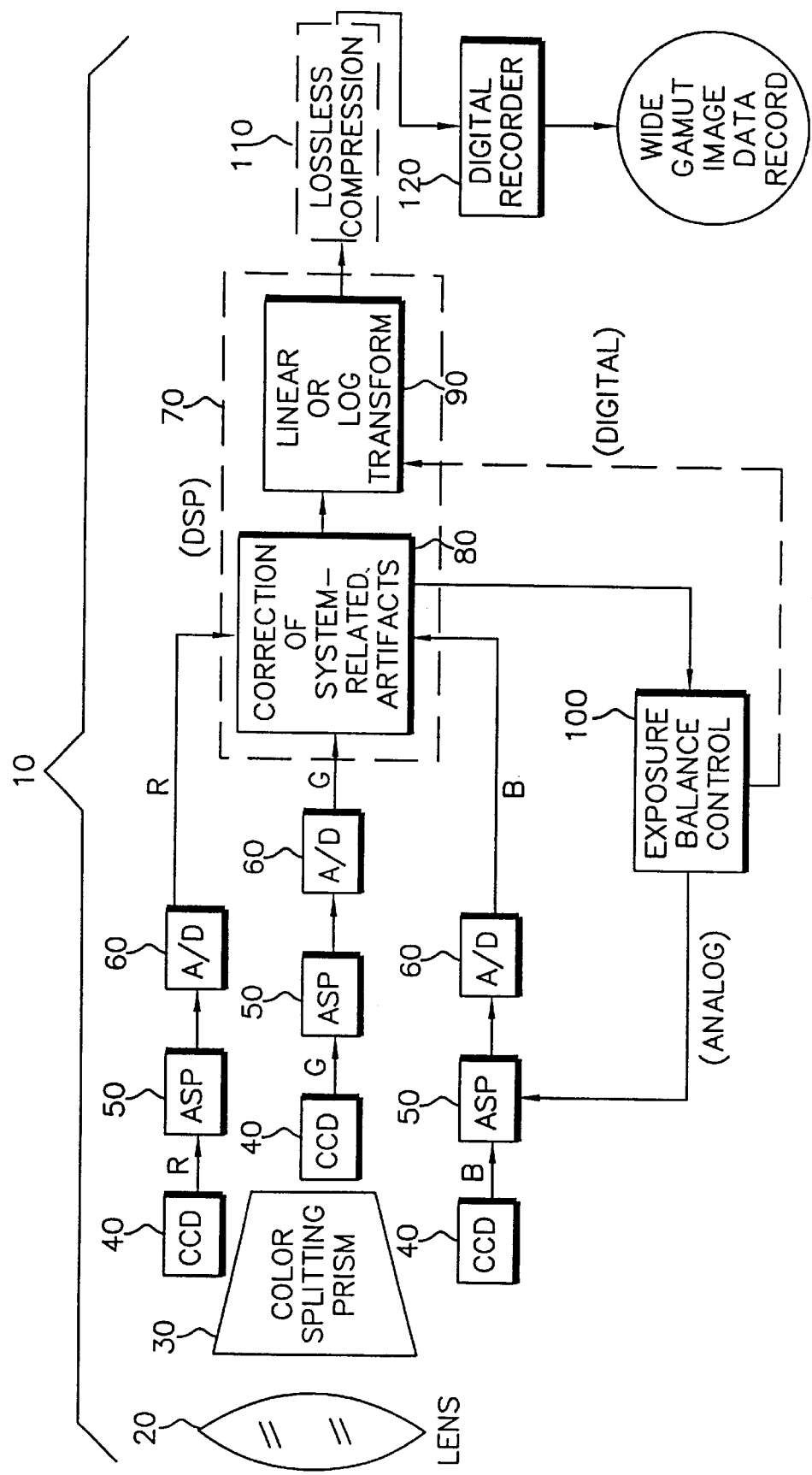
FIG. 1 is a camera of the present invention for capturing a sequence of incident images.

Referring to FIG. 1, there is illustrated a digital "data" camera 10 of the present invention, hereinafter referred to as a datacam, having a lens 20 for permitting ambient light to enter the camera 10 and a color splitting prism 30 for dividing the light into three separate red, green and blue (RGB) components, although those skilled in the art will recognize that other devices for separating the light into three color components may be used. Depending on the sensor's spectral characteristics, additional optical filtering may be added to achieve minimal electronic/digital gain for a specified white illuminant and to reduce aliasing (due to a sensor's spatial sampling geometry). Three photoelectric-type sensors 40 (preferably a charge-coupled device or CCD) each for receiving a particular color component as separated (filtered) by the color splitting prism 30, and then for respectively converting the particular color component into an electronic signal. Each sensor 40 preferably uses the same spatial resolution (the number of pixels per sensor). The absolute light sensitivity and dynamic range of the combined lens system (20), optical prism/filters (30) and sensors (40)—or any other light balancing filters—is to be comparable in magnitude to photographic film systems in terms of speed and exposure latitude; and the spatial resolution of the sensor to be sufficient for the user application. It is instructive to note that, if the color splitting prism is removed, a single sensor with a well known color-filtered array superimposed and in registration with the pixels may be used to accomplish the finction composed of the above-described prism and sensor combination. It also facilitates understanding to note that more than three sensors 40 may be used, and that other color channels, different in number and color, may also be used as those skilled in the art will readily recognize. The image data will be captured at a predetermined rate (e.g. 24 frames per second) by implementing any suitable technique to control the rate/time interval at which the sensor system gathers/integrates light (e.g. synchronized shutter).

Three analog signal processors (ASP) 50 respectively receive the electronic signal from the CCDs 40 for performing a plurality of processing functions on the analog signals, such as channel amplification, gain, etc. Three analog to digital (A/D) converters 60 respectively receive the signals from the ASPs for converting each signal into digital form. A digital signal processor (DSP) 70 receives all of the signals from the A/D converters 60 for performing a plurality of processing functions on the received digital signals, such as to modify the image information to reduce artifacts 80 (filtering to prevent aliasing), and to reduce electronic noise originating in the camera's components (the fixed pattern noise correction applied to sensor-type arrays-to eliminate the nonimage-related spurious signals associated with dark current and sensitivity difference between pixels). Additional signal processing (to linearize and/or optimally distribute the coded values in the analog to digital conversion) is performed by a linear or log transform 90 so that the RGB digital data is related to the light intensity measured by the sensor by a mathematical linear, log or power transfer function. Some of the operations described by the analog signal processor 50 could alternatively be done by the digital signal processor 70 or vice versa as those skilled in the art will recognize. An exposure balance controller 100 receives all three signals from the digital signal processor 70 and performs a white balance operation (i.e. signals are made equivalent for a particular white light source). This processing can be implemented by the ASP 50 (as illustrated by the solid line) or DSP 70 (as illustrated by the dashed line).

Optional data compression can be done after the DSP 70 operation as indicated by the lossless compressor 110. The data is then stored by a digital recorder 120 on some medium, such as magnetic tape, disc, and the like, as wide gamut image data. Wide gamut image data is defined as the data captured by the three independent red, green and blue sensors 40, which has not been reduced in scope as a result of the type of processing that occurs in the prior art to render the image data compatible for TV display (or a standard video format). It is understood that using current technology such processing associated with artifact correction 80, transform 90 and compression 110 is only needed due to the limitations of existing technology, and that with technological advances such processing would be unnecessary. It facilitates understanding to note that the wide gamut data is dependent upon the dynamic range, spectral responsivity, and spatial resolution of the sensor in combination with the spectral transmittance bandpass of the three color beam splitters (for example see commonly assigned U.S. Pat. No. 4,994,901).

Figure 2:
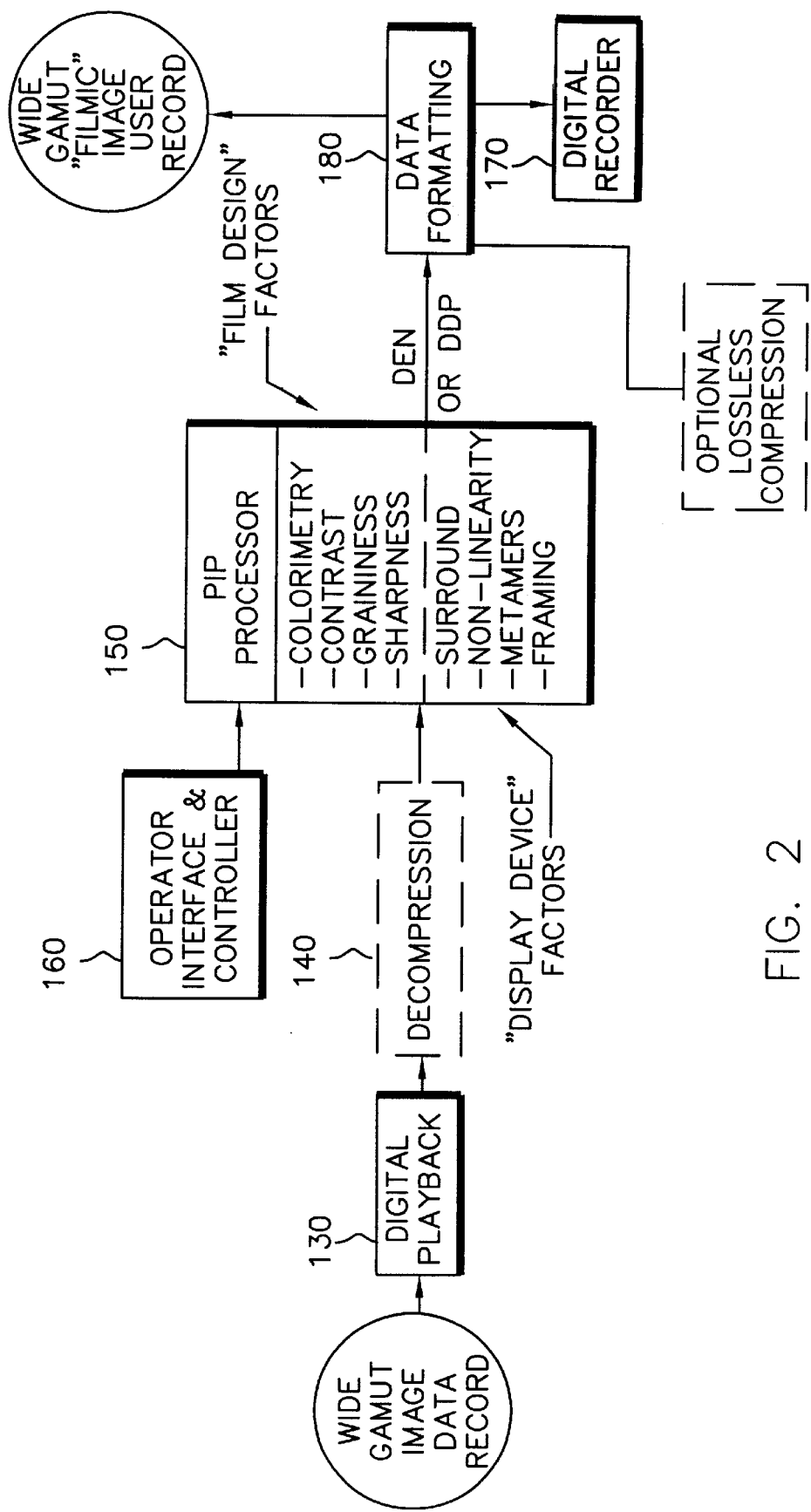
FIG. 2 is a block diagram illustrating the process of the present invention.

Referring to FIG. 2., after the images are recorded by the above-described process, the images are then processed. In this regard, the wide gamut image data is retrieved from the storage media by a playback device 130 and, if the data was originally compressed, it is sent to decompressor 140 for decompressing. Obviously, if the data was not originally compressed, this step is bypassed. A photoscience image processor 150, hereinafter referred to as a PIP, receives the digital file for converting the image data produced by the datacam 10 to a digital electronic negative (DEN) data profile which simulates the attributes of an image produced by a motion picture film negative; the output of the PIP 150 is defined herein as film-like appearance. The PIP 150 performs mathematical image processing by either software and/or hardware and will have the capability of applying a linear matrix and/or three dimensional look-up table (LUT) to the image data to reproduce the colorimetry of a motion picture negative (colorimetry); applying a transfer function to the image data to obtain the tone reproduction (contrast) characteristics of a motion picture film negative; applying a film granularity profile to the image data to simulate the graininess of a motion picture film system (graininess); applying a spatial frequency filtering response to the image data to simulate the modulation transfer function (MTF) of a motion picture negative film (sharpness); applying a transfer function to the image data to compensate for the visually perceived image contrast change due to the level of ambient light surrounding the image display (surround); applying a transfer function to the image data to compensate for any inherent non-linearity in the selected device for image display, for example, as with cathode ray tube displays(non-linearity); applying a linear matrix and/or 3D look-up table to the image data when the final image display medium will employ a set of color matching primaries different from a set of subtractive print film dyes in combination with a 5500 kelvin color temperature light source, for example, the color primaries of a liquid crystal display projector (metamers); and reducing/formatting the image data to conform within a specified image display aspect ratio, such as 16:9 (framing). Algorithms of the type associated with each of the above operations are reproducible by those skilled in the art.

An operator interface 160 may be manipulated by a user for permitting the selection of all or some of the processing functions listed above for customizing or simulating a particular "film image attribute profile." The PIP 150 creates either of two types of profiles depending on the processing functions selected by the user. Colorimetry, contrast, graininess, and sharpness are selected to produce a digital electronic negative (DEN) image type profile. If the DEN image profile is to be used for other than creating an optical print film for theatrical projection, a device digital print (DDP) image type profile would be created to tailor the DEN for a specified image display application by processing the DEN image profile through the additional PIP 150 device-dependent functions of surround, non-linearity, metamers and framing. The DEN or DDP image information is converted by device 180 into a user-type format (with optional lossless compression included in device 180), and then stored by a digital recorder 170 on any suitable storage medium. Therefore, the image record resulting from the two-stage process of capturing the image on the datacam and processing through the PIP is essentially a digital data representation of an image incorporating several of the imaging characteristics produced by a motion picture film.

The present invention provides for a two-stage electronic digital camera/processor system for producing a DEN containing an image data record that portrays the same image attributes found in the developed optical image of a motion picture negative film. This "electronic film system" (EFS) can be considered an "electronic" analogy to the conventional two-step image capture/development process that exists to produce an optical image record in a motion picture negative. The PIP digital processor 150 (second stage) in the EFS will also have the optional capability to create from the DEN a DDP image data record to transform the DEN image information to be compatible with a display device technology/viewing environment differing from the typical theatrical projected film image derived from a film camera negative (or its intermediate negative). This optional feature can also be considered somewhat analogous to the role that the "printer/print film/processing" plays in interacting with a film negative to create an image record suitable for viewing in a theater projector. However, by incorporating this feature in the PIP digital processor, various DDPs can be derived from a DEN depending on the display device (e.g. plasma display) and viewing environment (e.g. other than dark surround)—transforming the original DEN's film image profile to a display device when projected print film will not necessarily be the image display medium, but yet still possessing the imaging qualities of a motion picture negative. Since the image data resulting from the EFS is to primarily simulate the negative film's image information (DEN image record), the digital camera (first stage) employed in this system is not required to implement at its camera stage (unlike a video camera) the signal processing which modifies the sensor image data to fit specifically within the standard parameters required for video and/or television imaging applications. The system can therefore, produce a digital image record exhibiting the attributes of a motion picture negative film image that is also display device-independent.

The invention has been described with reference to a preferred embodiment. However, it will be appreciated that variations and modifications can be effected by a person of ordinary skill in the art without departing from the scope of the invention. For example, standard dual-channel digital audio and SMPTE time code may be recorded along with the image data.

What is claimed is:

1. An electronic image capture system for capturing a sequence of images, the system comprising:
   (a) a camera that captures a sequence of incoming incident light on a sensor and records the sequence of images as wide gamut image data, wherein the wide gamut data is dependent upon a dynamic range, spectral responsivity, and spatial resolution of the sensor, and wherein the wide gamut data exceeds ITU-R 601 standard video format associated with bandwidth limitation; and (b) a processor that receives the wide gamut image data and processes the image data to provide a film image attribute profile corresponding to an output image sequence, and wherein the film image attribute profile closely emulates characteristics of film.

2. The electronic image capture system as in claim 1, wherein said processor performs either or all of colorimetry, contrast, graininess, sharpness, surround, non-linearity, metamers and/or framing.

3. The electronic image capture system as in claim 1, wherein the sensor is a charge-coupled device which captures the incoming incident images.

4. The electronic image capture system as in claim 1 further comprising means for converting the sensor data to some other form of linear or logarithmic image data.

5. The electronic image capture system as in claim 1 further comprising a storage medium for storing the wide gamut from the sensor.

6. The electronic image capture system as in claim 5 further comprising a lossless data compression stage prior to recording.

7. The electronic image capture system as in claim 6 further comprising an exposure control for performing exposure control on the signals from the sensor before storage on the storage medium.

8. A method for capturing a sequence of images, the method comprising the steps of:

(a) capturing a sequence of incoming incident image data on a sensor of the camera and for recording the sequence of images as wide gamut image data, wherein the wide gamut data is dependent upon a dynamic range, spectral responsivity, and spatial resolution of the sensor, and wherein the wide gamut data exceeds ITU-R 601 standard video format associated with bandwidth limitation; and (b) receiving the wide gamut image data and processing the data to provide a film image attribute profile corresponding to an output image sequence, and wherein the film image attribute profile closely emulates characteristics of film.

9. The method as in claim 8, wherein step (b) includes producing images which simulate images captured on motion picture film.

10. The method as in claim 9, wherein step (b) includes performing either or all of colorimetry, contrast, graininess, sharpness, surround, non-linearity, metamers and/or framing.

11. The method as in claim 9, wherein step (a) includes capturing the images on a charge-coupled device.

12. The method as in claim 9 further comprising converting the sensor data to some other form of linear or logarithmic image data.

13. The method as in claim 9 further comprising providing a storage medium for storing the wide gamut from the sensor.

14. The method as in claim 13 further comprising providing a lossless data compression stage prior to recording.

15. The method as in claim 14 further comprising providing an exposure control for performing exposure control on the signals from the sensor before storage on the storage medium.

* * * * *